United States Patent
Zhang et al.

(10) Patent No.: US 11,122,219 B2
(45) Date of Patent: Sep. 14, 2021

(54) MID-SPAN DEVICE AND SYSTEM

(71) Applicant: Altia Systems, Inc., Cupertino, CA (US)

(72) Inventors: John Zhang, San Jose, CA (US); Naveed Alam, Cupertino, CA (US); Yashket Gupta, San Jose, CA (US); Ram Natarajan, Cupertino, CA (US)

(73) Assignee: ALTIA SYSTEMS INC., Cupertino, CA (US)

( * ) Notice: Subject to any disclaimer, the term of this patent is extended or adjusted under 35 U.S.C. 154(b) by 0 days.

(21) Appl. No.: 16/542,383

(22) Filed: Aug. 16, 2019

(65) Prior Publication Data

US 2020/0059607 A1 Feb. 20, 2020

Related U.S. Application Data

(60) Provisional application No. 62/719,686, filed on Aug. 19, 2018.

(51) Int. Cl.
*H04N 5/265* (2006.01)
*G06F 3/16* (2006.01)
*H04N 5/262* (2006.01)

(52) U.S. Cl.
CPC ............ *H04N 5/265* (2013.01); *G06F 3/165* (2013.01); *H04N 5/2628* (2013.01)

(58) Field of Classification Search
None
See application file for complete search history.

(56) References Cited

U.S. PATENT DOCUMENTS

| | | | |
|---|---|---|---|
| 9,251,410 B1* | 2/2016 | Lin | G06K 9/00295 |
| 9,736,367 B1* | 8/2017 | Alam | H04N 5/23238 |
| 2004/0008635 A1* | 1/2004 | Nelson | H04N 7/152 370/260 |
| 2010/0157016 A1* | 6/2010 | Sylvain | H04N 7/15 348/14.08 |
| 2019/0341050 A1* | 11/2019 | Diamant | G06K 9/00288 |

* cited by examiner

*Primary Examiner* — Kate H Luo
(74) *Attorney, Agent, or Firm* — HM Law Group LLP; Vani Moodley, Esq.

(57) ABSTRACT

A video processing device which can be implemented as a peripheral device is disclosed. The video processing device is configured to receive one or more videos and audio through a plurality interfaces. Further, the device receives one or more user input corresponding to one or more customization requests of the received video and the audio. The video processing device processes the video and the audio based on the received user input and outputs the processed video and audio via an output interface.

13 Claims, 3 Drawing Sheets

MID-SPAN DEVICE AND SYSTEM

This application claims the benefit of U.S. Provisional Patent Application No. 62/719,686 filed Aug. 19, 2018, which is incorporated by reference herein in its entirety.

TECHNICAL FIELD

The present disclosure relates to video camera systems for capturing panoramic images or videos. More particularly, the camera systems which utilizes a processing method for capturing and producing panoramic images or videos.

BACKGROUND OF THE DISCLOSURE

Mobile devices such as cellular smart phones may have a single camera sensor for capturing panoramic images with increased field of view (FOV). The single camera sensor may be rotated for producing panoramic videos/photos to capture a higher degree FOV. However, the quality of panoramic image or video produced by a single camera sensor may be hampered due to various distortions and poor resolution. Therefore, camera systems which may provide enhanced quality panoramic images and videos with increased FOV are required. Further, camera systems which may be embedded in mobile devices or operable by a mobile device for producing high quality panoramic images and videos are required.

SUMMARY OF THE DISCLOSURE

The present disclosure relates to a video processing device which is configured as a peripheral device. The video processing device is configured to receive video inputs from one or more cameras via input interfaces. The video processing device receives audio input from one or more mics attached via input interfaces. The video processing device receives one or more user input to customize the video inputs and the audio inputs received, based on a user request. The video processing device then processed the video and audio as per the user request and outputs the processed video via an output interface.

The output interface may be connected to one or more output devices such as but not limited to image or video display devices, monitors, display screens, projectors, and audio output devices.

In an embodiment, the user request to customize the input videos and audio may be to display zoom in view of one or more video or a portion of the video.

In an embodiment, the user request to customize the input videos and audio may be to create a composite view of the received video inputs. More details of generating the composite view of the received videos is described in U.S. patent application Ser. No. 13/902,136 titled "Locally Adaptive Luminance and Chrominance Blending in a Multiple Imager Video System" and U.S. patent application Ser. No. 13/902,186 titled "Dynamic Stitching for a Multiple Imager Video System" and U.S. patent application Ser. No. 13/902,248 titled "Stitching for a Multiple Imager Video System Based On a Non-Linear Seam" which are incorporated herein in its entirety.

In an embodiment, the video processing device comprises a plurality of buffers to store each of the received one or more video streams from one or more cameras attached.

In an embodiment, the user request to customize the input videos and audio may be to convert the received one or more videos to a H.264 video format.

In an embodiment, the user request to customize the input videos and audio may be to provide a passthrough of the audio received and/or one of the videos received.

In an embodiment, the user request to customize the input videos and audio may be to determine the active speaker in the one or more received videos. The video output through the output port is the video of the active speaker determined in the received videos.

In an embodiment, the user request to customize the input videos and audio may be to recognize faces in the one or more received videos based on a pre-defined database or a database of a social media channel connected via an internet connection with the video processing device.

The details of one or more embodiments are set forth in the accompanying drawings and the description below.

DETAILED DESCRIPTION OF THE DISCLOSURE

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
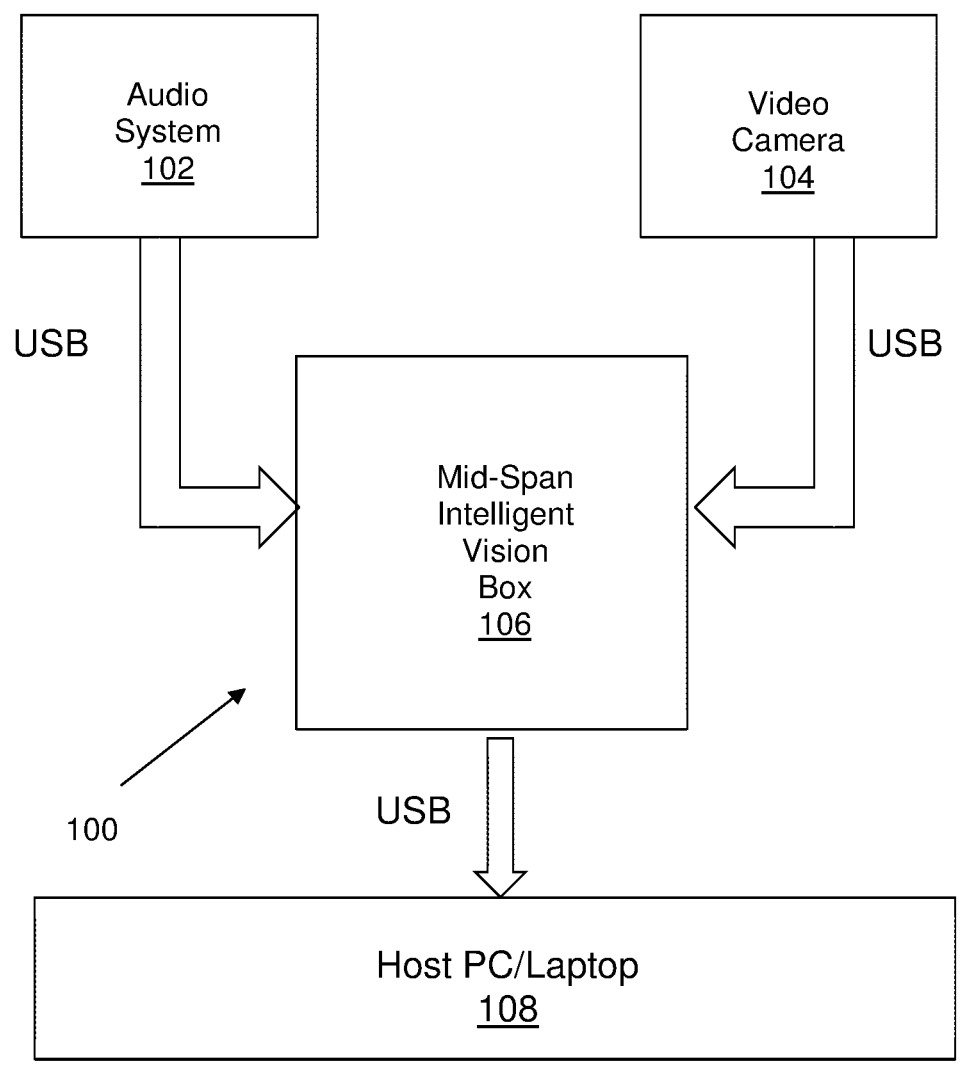
FIG. 1 illustrates a system architecture, in accordance with one embodiment of the invention, comprising a mid-span intelligent vision box 100.

FIG. 1 illustrates a system 100 for processing a video, in accordance with one embodiment of the invention. As will be seen, the system 100 includes an audio subsystem 102 and a video camera system 104. Both subsystems 102 and 104 are interfaced with a mid-span intelligent vision box 106 which is communicably coupled to a host PC/laptop 108. Thus, the mid-span intelligent vision box 106 is disposed between regular video/audio peripherals and one or more hosts. The mid-span intelligent vision box 106 may itself be a peripheral. Functionally, the device provides the capability to further process/enhance any video, while maintaining the simplicity of a plug-and-play peripheral device.

The audio subsystem 102 may include any device capable of outputting sound. Any device capable of playing or reading digital content as an audio (e.g. voice, music). The video camera system 104 may be implemented as described in co-pending U.S. patent application Ser. No. 15/860,576 entitled "Panoramic Camera Device" which is incorporated herein in its entirety.

Figure 2:
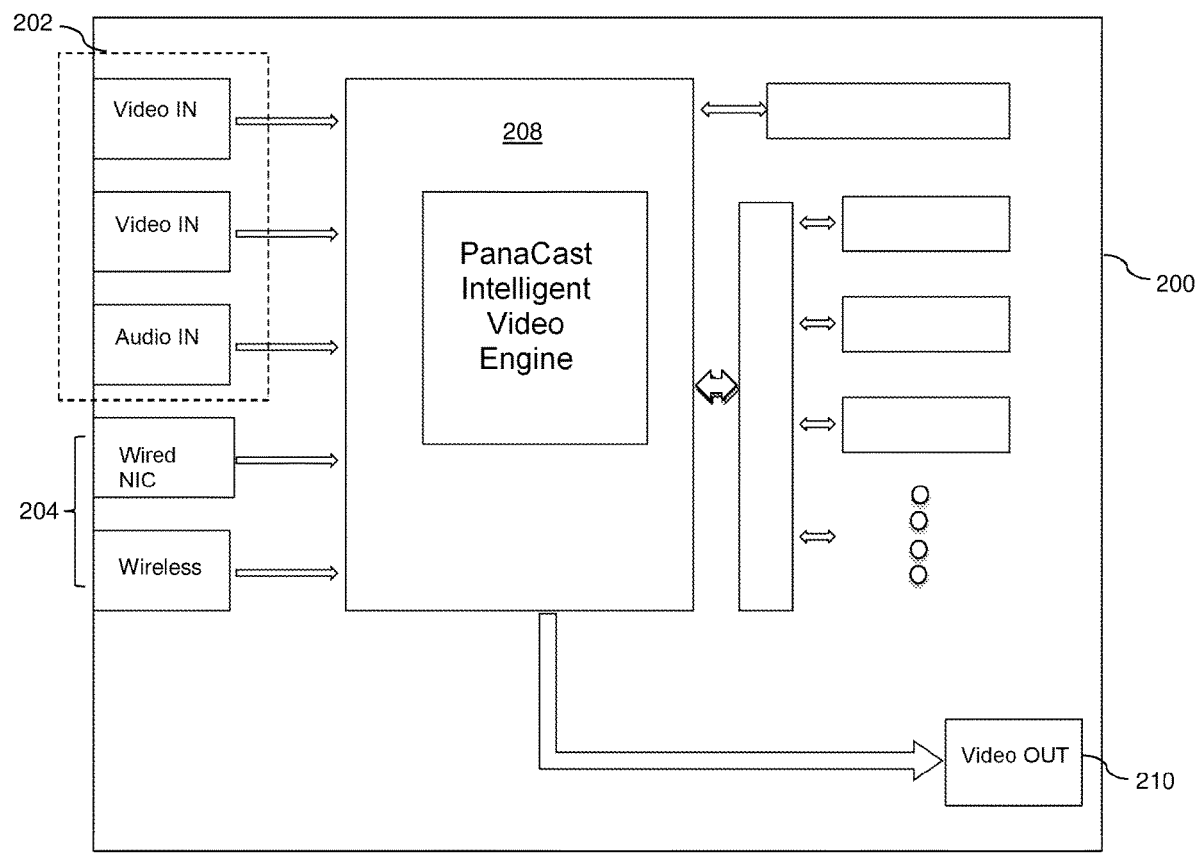
FIG. 2 illustrates a high-level block diagram of the mid-span intelligent vision box 200, in accordance with one embodiment of the invention.

Referring now to FIG. 2 of the drawings, there is shown a high-level block diagram of the mid-span intelligent vision box 106 of FIG. 1, in accordance with one embodiment of the invention. It will be seen that the box 200 includes an intelligent video engine 208 which is coupled to one or more video/audio interfaces 202 and one or more network interfaces 204. Functionally, the intelligent video engine 208 intercepts input video/audio streams bound for a host in order to perform further processing and analytics. The box 200 outputs a modified/enhanced video stream via video OUT port 210. In some embodiments, the output from the video OUT port 210 may be the same as the input stream. In other embodiments, said output may comprise a synthetic stream. For example, the stream may comprise a zoomed-in view of the input video content. In some embodiments the output video may comprise composite view aggregating a plurality of video streams based on analytics. In one embodiment, the mid-span intelligent video box 200 may be configured to deliver an output of multiple streams comprising, an original stream and multiple processed streams through the video OUT port 210, which in some embodiments may comprise a single USB output interface. More details of the videoconferencing and streaming can be found in the U.S. patent application Ser. No. 14/058,192 filed Oct. 18, 2013, which is incorporated by reference herein in its entirety.

In an embodiment, the network interfaces 204 may be implemented as but not limited to wireless technology such as IrDA, RF, Bluetooth, IEEE 802.11, HiperLan2 among others. In an embodiment, the network interfaces 204 may be implemented as but not limited to wired connection such as serial interfaces, parallel interfaces, USB interfaces among others.

Figure 3:
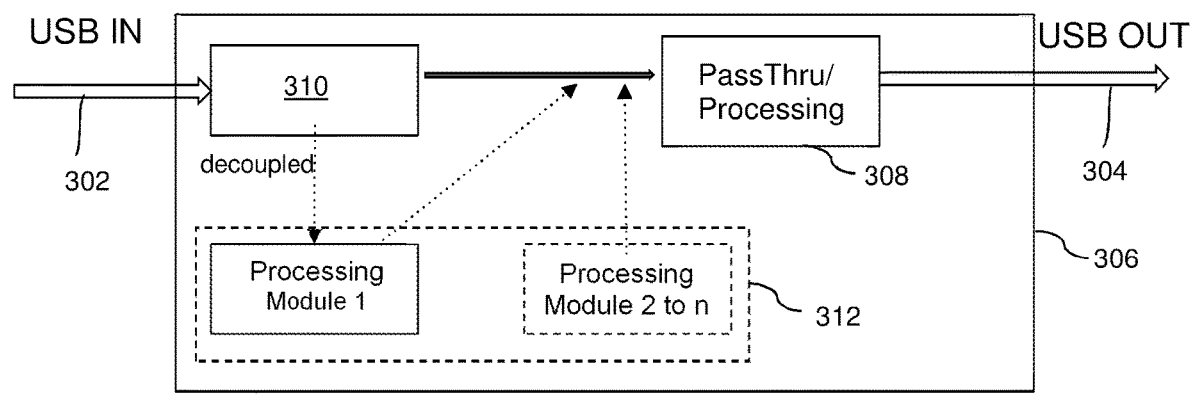
FIG. 3 illustrates a high-level block diagram of an intelligent visual engine 300, in accordance with one embodiment of the invention.

FIG. 3 of the drawings shows an architecture for the intelligent video engine 208 of FIG. 2, in accordance with one embodiment of the invention. As will be seen, the engine 208 includes a unit 310 capable of splitting an incoming video stream from USB IN port 302 into multiple streams for further processing by one or more processing units 312. The processing units 312 are configured to further process or enhance the incoming video stream. A pass-through processing unit 308 is responsible for sending the original stream as an output via the output 304, without any latency.

In an embodiment, the mid-span device 100 of FIG. 1 as disclosed herein provides a low latency path for a video while enabling analytics on at least one different asynchronous stream. To meet video conference requirements, the latency has to be less than 300 ms. To achieve this, first, the disclosed mid-span device 100 decouples the pass-through video via buffer units to extract a stream required for further processing using the processing modules 312. While the result of the processing modules 312 is fed to the output video stream, a single feedback may be applied to all the subsequent videos until the next feedback arrives. Thus, the relatively slower processing does not hold back the main video path. There are multiple types of processing modules available to achieve functionalities described below. Not all may be required at the same time.

Once a low latency video path is achieved, other services that are traditionally done on more powerful PCs can be introduced into the disclosed mid-span device, to provide extra benefits with the convenience of a peripheral device. The processing, analytics and management which can be provided through the mid-span device include:

Addon services can run on otherwise peripheral devices. At the same time, the devices are used just like a peripheral with simple use interface such as USB plug and play.

The mid-span device may convert a simple non-H264 camera into an H.264 camera by intercepting the video frame and compressing the stream. There are systems that only take H.264 streams from a webcam. Since most of the webcams do not support a H.264 stream, these cameras cannot be used. Thus, the mid-span device will make it possible to use these webcams.

The mid-span device can also convert the stream to other formats. In the future, other systems may prefer to take other encoded formats such as VP9. The Mid-span box can achieve that with a software upgrade. More details of spatial scalability can be found in the U.S. patent application Ser. No. 15/280,913 filed Sep. 29, 2019, titled "Spatial Scalability Using Off the Shelf Encoders and Decoders" which is incorporated by reference herein in its entirety.

The mid-span device can also take audio input and provide passthrough for audio.

The mid-span device can intercept both Video and Audio information and provide Active Speaker Tracking. The output video of the device will be active speaker video.

The mid-span device can recognize WhiteBoard, extract it, do the necessary correction and provide a stream of whiteboard output as a video stream.

The mid-span device box can provide multiple streams simultaneously through a single USB interface.

The mid-span device can recognize faces, and count number of the people in the view. This information can be provided through USB interface along with the video, or through the network if it's present.

With a network interface, the mid-span device can be managed remotely. This includes firmware update, health monitoring, status check and so on.

With a network interface, the mid-span device can provide transcripts of the meeting through cloud speech recognition. It can also associate faces with the transcripts.

Without a network interface, the mid-span device can provide transcripts with built-in speech recognition.

The mid-span device will have an extensible architecture so that computational capacity can increase depending on the workload demand, by plugging in extra computational nodes.

This mid-span device box is used as a peripheral. It provides a single USB. End users only need to plug in this single interface to their machines. The device will work without any software installation in most of the modern machines with various operating systems (OS).

Each of structures/unit described above may be implemented as modules. As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules.

In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures.

In general, the modules/routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment.

Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A peripheral video processing device, comprising:
a plurality of first interfaces to communicably connect the peripheral video device to a camera as a plug in, said first interfaces configured to receive one or more videos from the camera;
a second interface configured to receive audio from the camera;
a unit configured to split videos into multiple streams;
a pass-through processing unit configured to send the original stream as an output without any latency;
a module to receive one or more user inputs corresponding to one or more customization requests to customize the one or more videos and audio received;
one or more processing modules to make one or more customizations to one or more split videos and audio based on the one or more customization requests, wherein the one or more processing modules are configured to determine at least one of an active speaker in one or more received videos and a number of faces in the one or more received videos; and an output interface to output customized video and audio.

2. The video processing device of claim 1, wherein the one or more customizations comprises zooming in on the one or more videos.

3. The video processing device of claim 1, wherein the one or more customizations comprises creating a composite video of the received one or more videos.

4. The video processing device of claim 1, wherein the one or more videos are asynchronously received.

5. The video processing device of claim 1, further comprising a plurality of buffers to store each of the received one or more videos.

6. The video processing device of claim 1, wherein the one or more customizations comprises converting the received one or more videos into a H.264 video format.

7. The video processing device of claim 1, wherein the one or more customizations comprises outputting a pass-through of the audio received.

8. The video processing device of claim 1, wherein the output video corresponds to the video including the determined active speaker.

9. The video processing device of claim 1, wherein the output interface outputs a plurality of videos simultaneously.

10. The video processing device of claim 1, configured to recognize faces in the one or more received videos.

11. The video processing device of claim 10, configured to recognize speech corresponding to the determined active speaker and generate one or more transcripts of the recognized speech.

12. The video processing device of claim 11, wherein the generated one or more transcripts are associated with an ID of the active speaker.

13. A video processing method comprising:

receiving one or more videos through a plurality of first interfaces at a peripheral device plugged in to a camera;

receiving, at the peripheral device, an audio via a second interface;

processing, by the peripheral device, the one or more videos and the audio based on the received one or more user inputs comprising splitting the videos into multiple streams and sending, by a pass-through unit the original video stream as an output without any latency;

receiving, at the peripheral device, one or more user inputs corresponding to one or more customization requests corresponding to the one or more videos received and the audio received;

customizing, by the peripheral device, the one or more videos and the audio based on the received one or more user inputs comprising determining at least one of an active speaker in one or more received videos and a number of faces in the one or more received videos; and outputting, by the peripheral device, the customized video and audio via an output interface.

* * * * *